(12) United States Patent
Chen et al.

(10) Patent No.: US 11,422,333 B2
(45) Date of Patent: Aug. 23, 2022

(54) OPTICAL MEMBER DRIVING MECHANISM

(71) Applicant: TDK TAIWAN CORP., Taoyuan (TW)

(72) Inventors: Sheng-Zong Chen, Taoyuan (TW); Sung-Mao Tsai, Taoyuan (TW); Chen-Chi Kuo, Taoyuan (TW)

(73) Assignee: TDK TAIWAN CORP., Tao Yuan (TW)

( * ) Notice: Subject to any disclaimer, the term of this patent is extended or adjusted under 35 U.S.C. 154(b) by 69 days.

(21) Appl. No.: 16/805,144

(22) Filed: Feb. 28, 2020

(65) Prior Publication Data

US 2021/0055504 A1   Feb. 25, 2021

Related U.S. Application Data

(60) Provisional application No. 62/890,731, filed on Aug. 23, 2019.

(30) Foreign Application Priority Data

Dec. 20, 2019  (EP) ..................................... 19218896

(51) Int. Cl.
*G02B 5/04*     (2006.01)
*G02B 7/18*     (2021.01)

(52) U.S. Cl.
CPC ...................................... *G02B 7/18* (2013.01)

(58) Field of Classification Search
CPC ........... G02B 7/18; G02B 7/09; G02B 13/001
USPC ........................................................ 359/833
See application file for complete search history.

(56) References Cited

U.S. PATENT DOCUMENTS 9,341,790 B2 * 5/2016 Graves ................. G02B 6/3512
10,852,534 B2 * 12/2020 Scholl .................. G02B 26/105

* cited by examiner

*Primary Examiner* — Euncha P Cherry
(74) *Attorney, Agent, or Firm* — Muncy, Geissler, Olds & Lowe, PC

(57) ABSTRACT

An optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

14 Claims, 9 Drawing Sheets

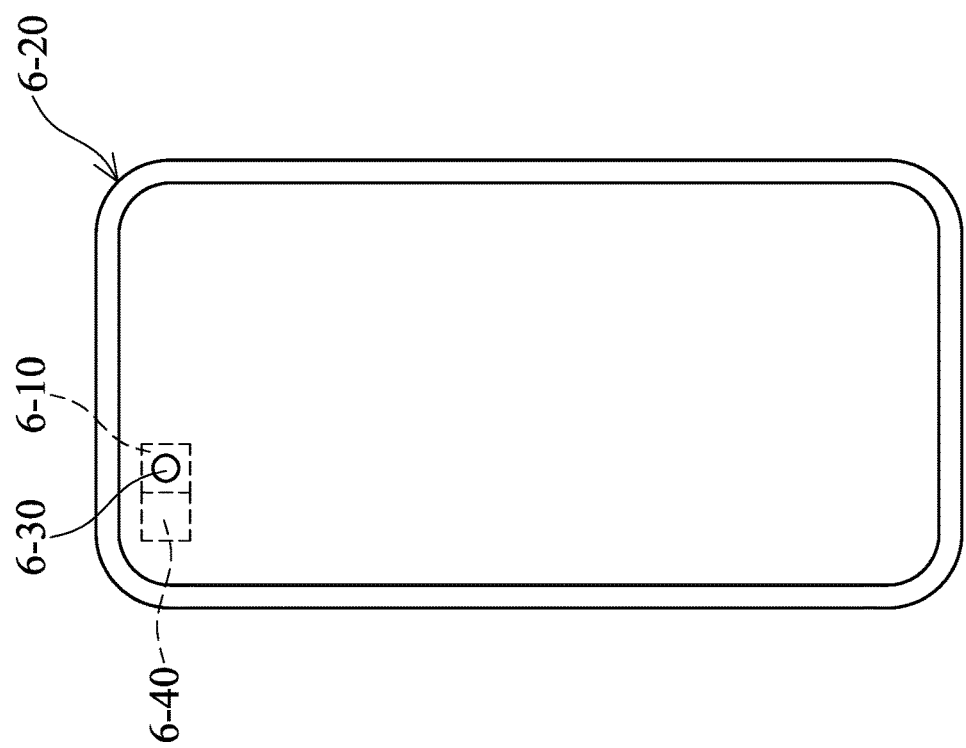
FIG. 1
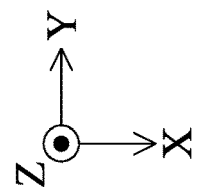

OPTICAL MEMBER DRIVING MECHANISM

CROSS REFERENCE TO RELATED APPLICATIONS

The present application claims priority to U.S. Provisional Patent Applications No. 62/890,731, filed in Aug. 23, 2019, and Europe Patent Applications No. 19218896.9, filed on Dec. 20, 2019, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. More and more choices are available for users to choose from. However, when a lens with a long focal length is disposed in an electronic device, the electronic device becomes thicker, and as such it is hard to make the electronic device thin.

BRIEF SUMMARY OF INVENTION

To address the deficiencies of conventional products, an embodiment of the invention provides an optical member driving mechanism, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

In some embodiments, the optical member driving mechanism further includes a supporting member, the fixed portion includes a base, and the supporting member is disposed between the movable portion and the base to form a gap. For example, the supporting member is a ball. The movable portion has a bottom surface and an annular structure, the bottom surface faces the base, and the annular surface protrudes from the bottom surface and surrounds the supporting member. The inner diameter of the annular structure is substantially the same as the diameter of the supporting member. The supporting member protrudes from the annular structure.

In some embodiments, the optical member is configured to adjust a emission direction of light from an incident direction to an outgoing direction, and the center of the optical member overlaps the supporting member as seen from the incident direction. The driving assembly can drive the movable portion to rotate around a first rotation axis and a second rotation axis relative to the fixed portion, the first rotation axis is perpendicular to the second rotation axis, and the supporting member is disposed on the intersection of the first rotation axis and the second rotation axis.

In some embodiments, the optical member driving mechanism further includes an elastic member, connected to the fixed portion and the movable portion, and providing an elastic force to the movable portion. The fixed portion includes a base, and the elastic force pushes the movable portion close to the base.

In some embodiments, the elastic member includes a first engaged section, a second engaged section, a first axis section, a second axis section, and a string section. The first engaged section is connected to the fixed portion. The second engaged section is connected to the movable portion. The first axis section is connected to the first engaged section. The second axis section is connected to the second engaged section. The string section is connected to the first axis section and the second axis section.

In some embodiments, the driving assembly can drive the movable portion to rotate around a first rotation axis and a second rotation axis relative to the fixed portion, and the first rotation axis is perpendicular to the second rotation axis. In a direction perpendicular to the first rotation axis and the second rotation axis, the string section is divided into a first length and a second length by the first axis section, and the first length is substantially the same as the second length. In some embodiments, the first length is different from the second length.

In some embodiments, the first axis section is parallel to the first rotation axis, and the first axis section does not overlap the first rotation axis as seen from the second rotation axis.

In some embodiments, the movable portion includes a restriction structure having an inclined surface, and the inclined surface faces the optical member.

BRIEF DESCRIPTION OF DRAWINGS

The invention can be more fully understood by reading the subsequent detailed description and examples with references made to the accompanying drawings, wherein:

FIG. 1 is a schematic diagram of an electronic device according to an embodiment of the invention;

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Referring to FIG. 1, in an embodiment of the invention, an optical member driving mechanism 6-10 can be disposed in an electronic device 6-20. The optical member driving mechanism 6-10 is configured to hold an optical member 6-30 and drive the optical member 6-30 to move relative to an image sensor module (not shown) in the electronic device 6-20, so as to achieve the purpose of focus adjustment. For example, the electronic device 6-20 can be a digital camera or a smart phone having the function of capturing photographs or making video recordings, and the optical member 6-30 can be a prism or a mirror. When capturing photographs or making video recordings, light enters the optical member driving mechanism 6-10 along an incident direction (−Z-axis), and after being reflected by the optical member 6-30, the light moves in the outgoing direction (−Y-axis) through an optical system 6-40 in the electronic device 6-20 until it reaches the image sensor module. The optical system 6-40 is configured to focus or adjust the light path, and can be adjusted or omitted as required.

Figure 2:
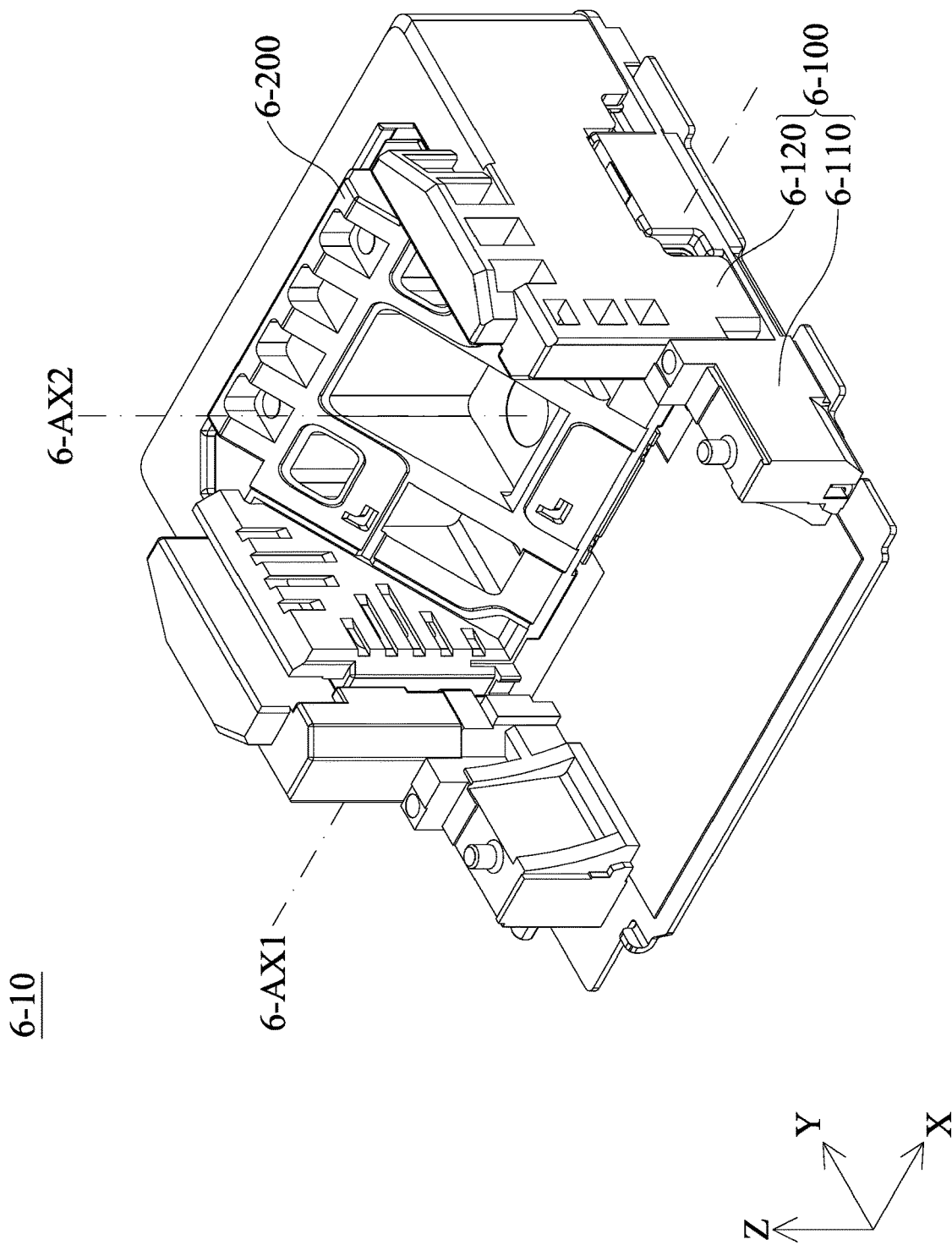
FIG. 2 is a schematic diagram of an optical member driving mechanism according to an embodiment of the invention.
Figure 3:
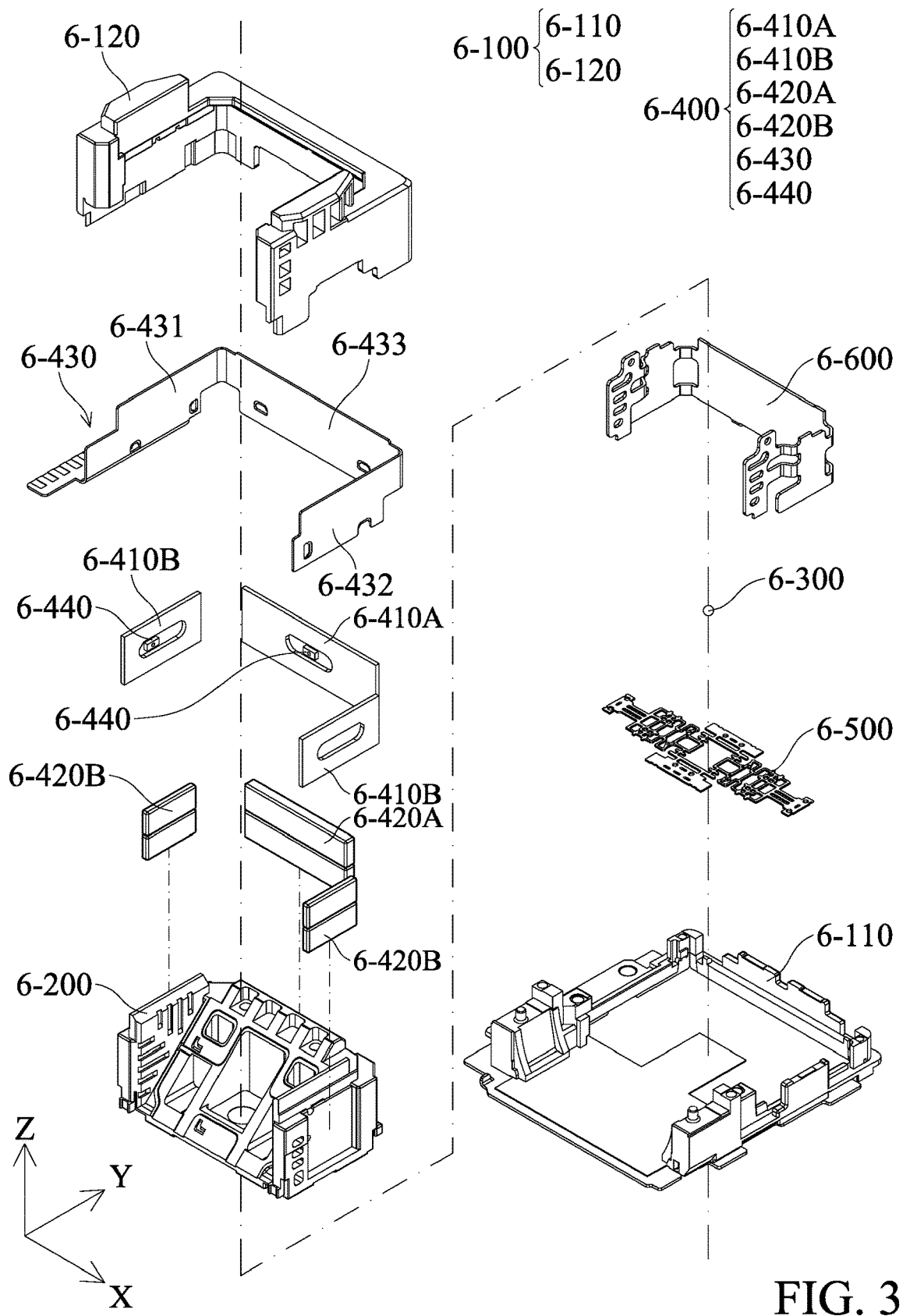
FIG. 3 is an exploded-view diagram of the optical member driving mechanism according to an embodiment of the invention.

Referring to FIGS. 2 and 3, the optical member driving mechanism 6-10 primarily includes a fixed portion 6-100, a movable portion 6-200, a supporting member 6-300, a driving assembly 6-400, an elastic member 6-500, and a magnetic permeability member 9-600.

Figure 5A:
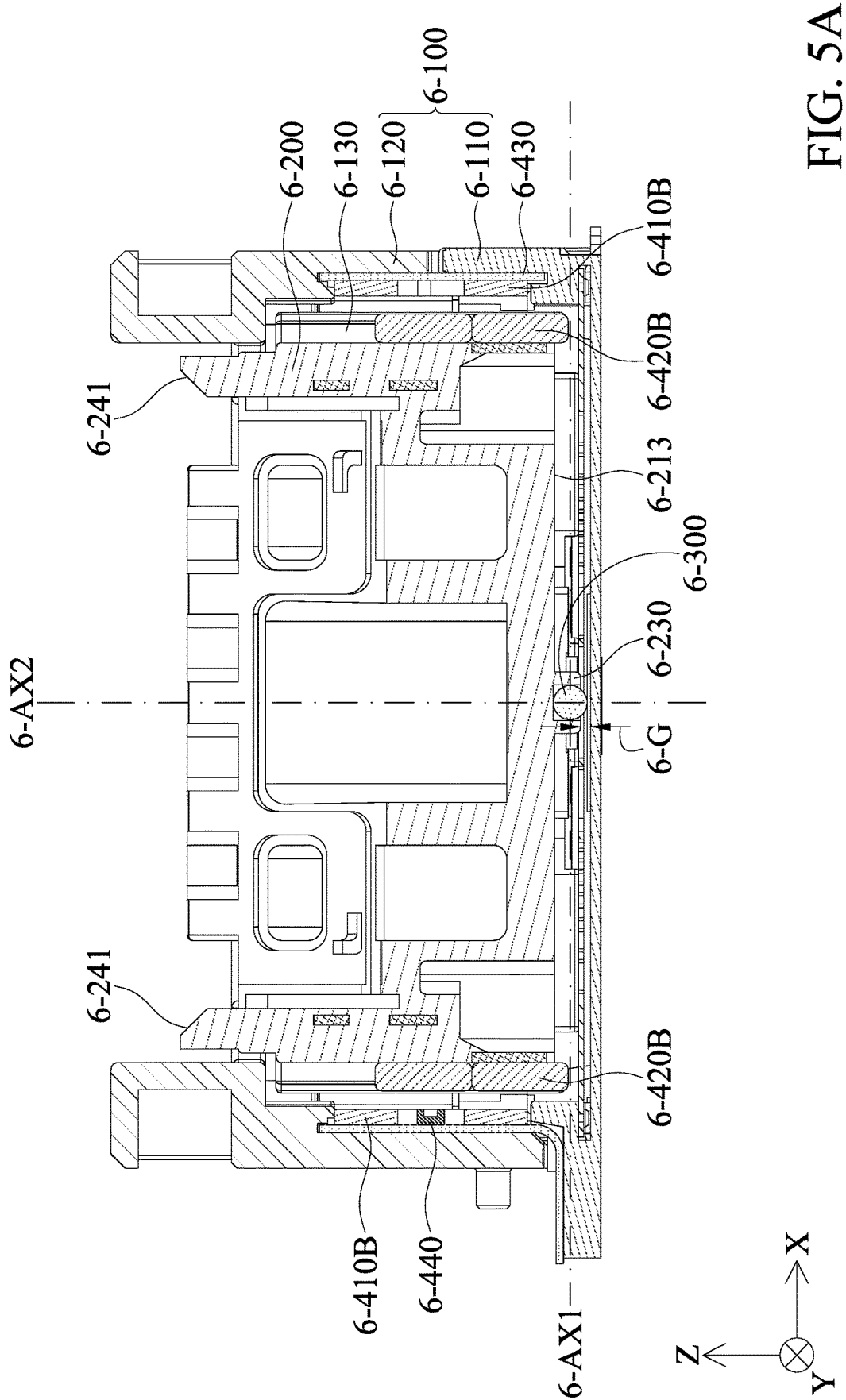
FIG. 5A is a cross-sectional view of the optical member driving mechanism according to an embodiment of the invention.
Figure 5B:
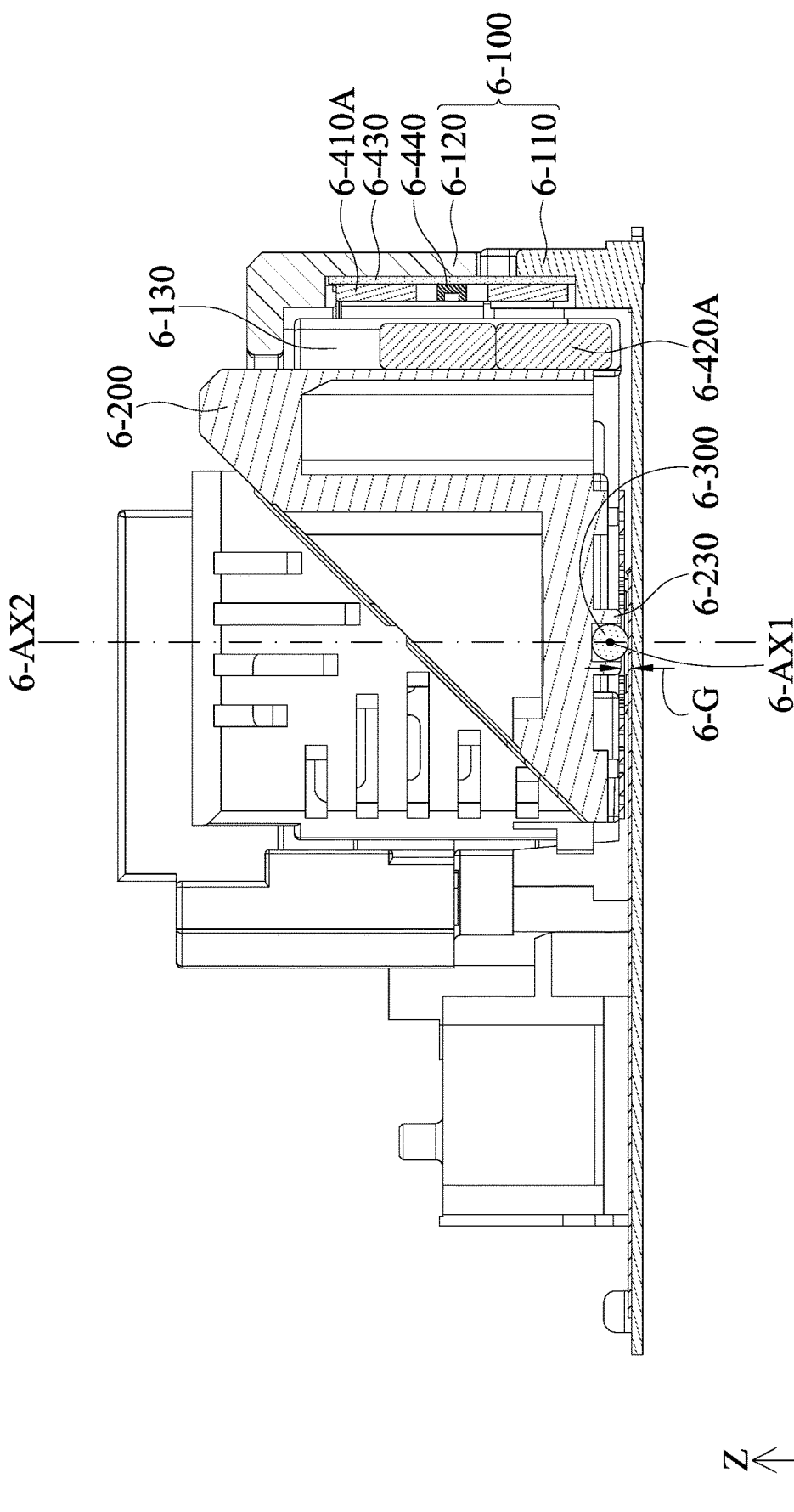
FIG. 5B is another cross-sectional view of the optical member driving mechanism according to an embodiment of the invention.

The fixed portion 6-100 includes a base 6-110 and a housing 6-120. The base 6-110 and the housing 6-120 can be assembled using snap-fit joints or an adhesive member, and an accommodating space 6-130 can be formed after assembly (as shown in FIGS. 5A and 5B). The movable portion 6-200 can be an optical member holder, and the optical member 6-30 is disposed on the movable portion 6-200. When the movable portion 6-200 is movably connected to the fixed portion 6-100, the movable portion 6-200 and the optical member 6-30 are accommodated in the accommodating space 6-130 of the fixed portion 6-100.

Figure 4A:
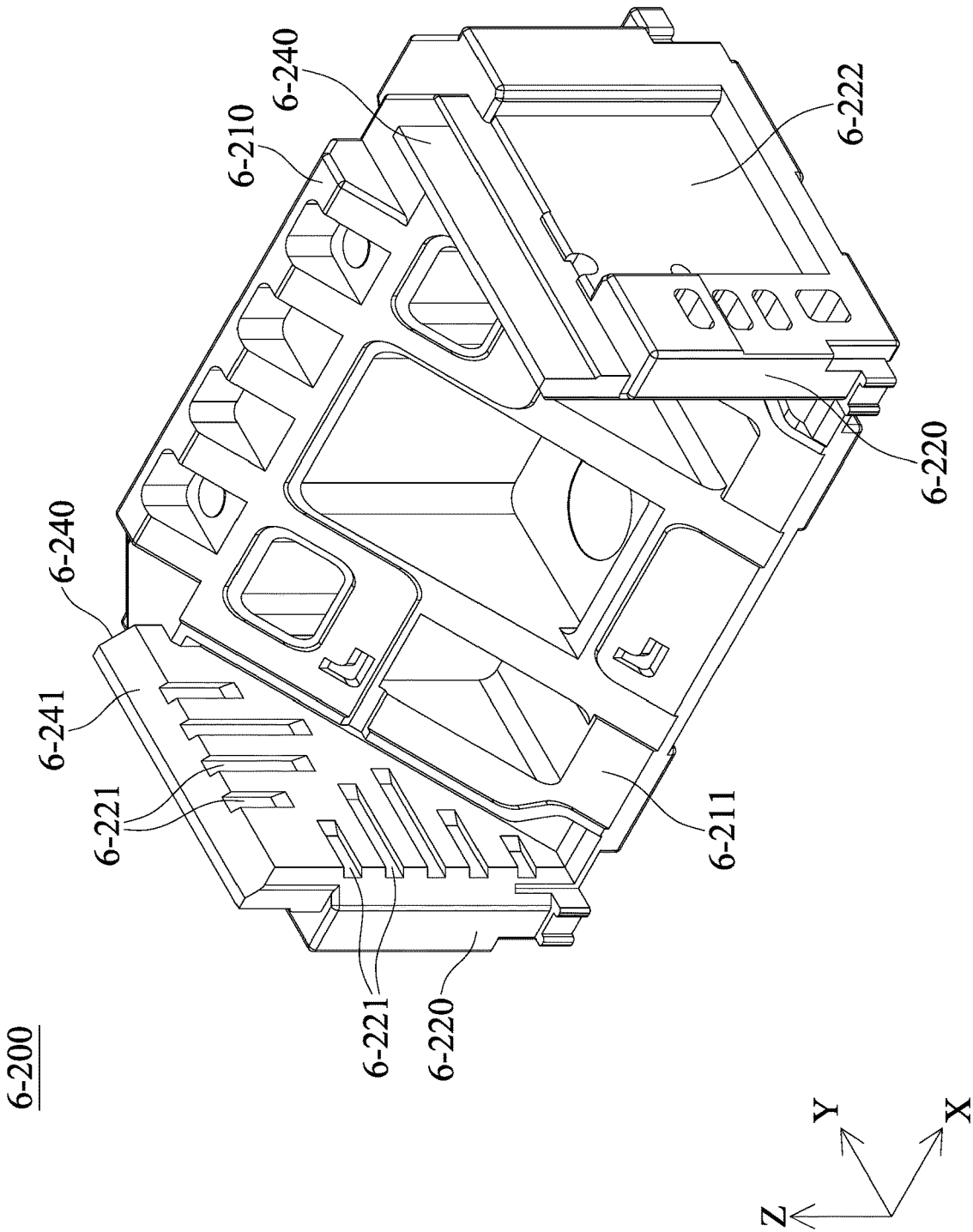
FIG. 4A is a schematic diagram of a movable portion according to an embodiment of the invention.
Figure 4B:
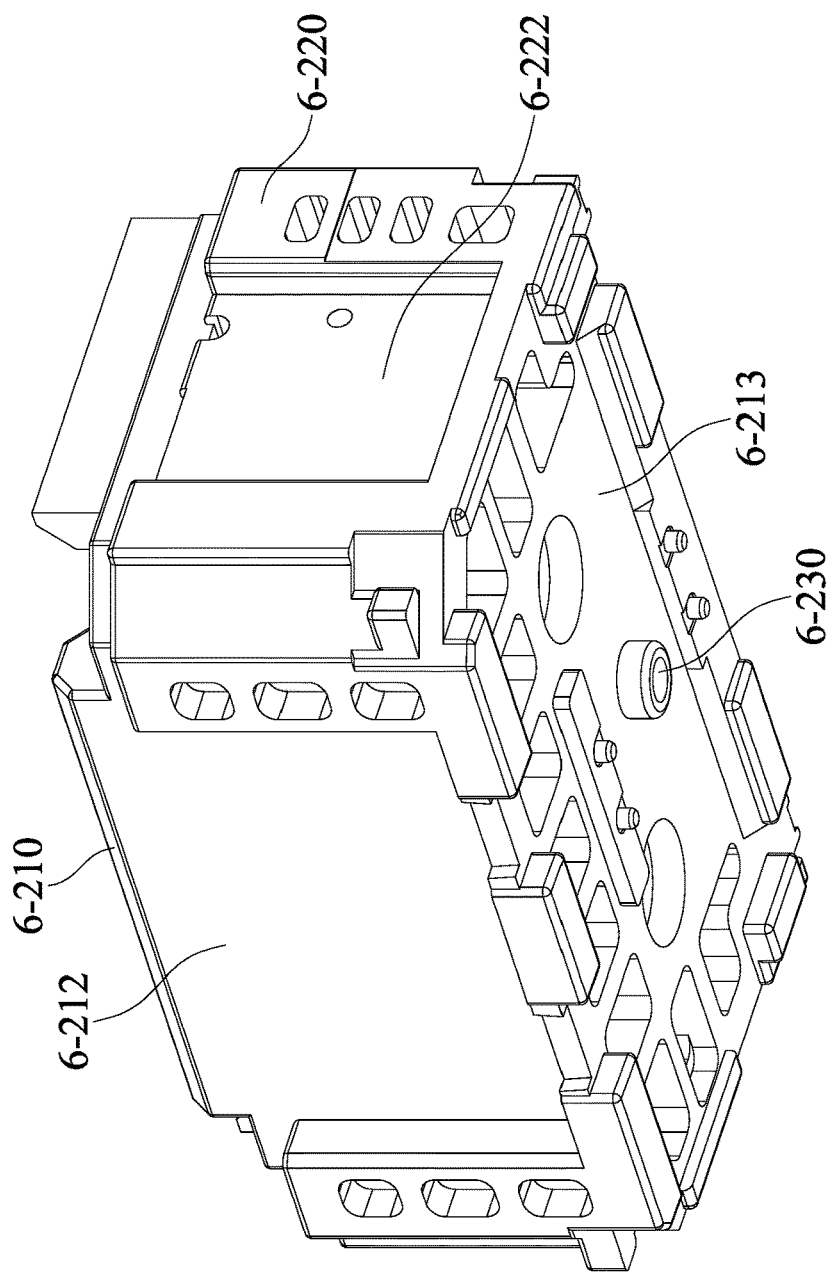
FIG. 4B is a schematic diagram of the movable portion in another view according to an embodiment of the invention.

As shown in FIGS. 4A and 4B, the movable portion 6-200 includes a main body 6-210 and two lateral walls 6-220 respectively connected to the opposite side of the main body 6-210. A plurality of grooves 6-221 are formed on the inner surface of each of the lateral walls 6-220, wherein the inner surface faces the main body 6-210. The user can dispose the optical member 6-30 on the inner surface 6-211 of the main body 6-210, and then infuse adhesive glue into the grooves 6-221. Therefore, the optical member 6-30 can be affixed to the movable portion 6-200.

A depression 6-212 is formed on the outer surface of the main body 6-210, and an annular structure 6-230 is formed on the bottom surface 6-213 of the main body 6-210. The annular structure 6-230 protrudes from the bottom surface 6-213. Each of the lateral walls 6-200 has a depression 6-222 and a restricting structure 6-240. The depression 6-222 is formed on the outer surface of each of the lateral walls 6-220, and the restricting structure 6-240 is positioned on the top side of each of the lateral walls 6-220. Each of the restricting structures 6-240 has an inclined surface 6-241 facing the optical member 6-30.

As shown in FIGS. 3, 5A and 5B, the supporting member 6-300 can be a ball. After the optical member driving mechanism 6-10 is assembled, the supporting member 6-300 is disposed between the base 6-110 and the movable portion 6-200, and contacts the base 6-110 and the bottom surface 6-213 of the movable portion 6-200. Moreover, the supporting member 6-300 is surrounded by the annular structure 6-230.

Since the thickness of the supporting member 6-300 is greater than the thickness of the annular structure 6-230 in the Z-axis, the movable portion 6-200 is supported by the supporting member 6-300 and does not contact the base 6-110. A gap 6-G can be formed between the movable portion 6-200 and the base 6-110.

In this embodiment, the inner diameter of the annular structure 6-230 is substantially the same as the diameter of the supporting member 6-300, so that the supporting member 6-300 can be positioned. Furthermore, as seen from the Z-axis, the annular structure 6-230 and the supporting member 6-300 overlap the center of the optical member 6-30.

Referring to FIGS. 3, 5A and 5B, the driving assembly 6-400 includes first electromagnetic driving members 6-410A and 6-410B, second electromagnetic driving members 6-420A and 6-420B, a circuit board 6-430, and position sensors 6-440.

The circuit board 6-430 is affixed to the housing 6-120 and has a U-shaped structure. In other words, the circuit board 6-430 can be divided into a left segment 6-431, a right segment 6-432, and a middle segment 6-433. The middle segment 6-433 connects the left segment 6-431 to the right segment 6-432, and the normal direction of the middle segment 6-433 is different from the normal direction of the left segment 6-431 and the normal direction of the right segment 6-432.

The first electromagnetic driving members 6-410A and 6-410B are disposed on the circuit board 6-430. In this embodiment, the driving assembly 6-400 includes one first electromagnetic driving member 6-410A and two first electromagnetic driving members 6-410B. The first electromagnetic driving member 6-410A is disposed on the middle segment 6-433 of the circuit board 6-430, and two first electromagnetic driving members 6-410B are respectively disposed on the left segment 6-431 and the right segment 6-432 of the circuit board 6-430.

The second electromagnetic driving members 6-420A and 6-420B are disposed on the movable portion 6-200, and the positions of the second electromagnetic driving members 6-420A and 6-420B respectively corresponds to the positions of the first electromagnetic driving members 6-410A and 6-410B. Therefore, the second electromagnetic driving member 6-420A can be disposed on the main body 6-210 of the movable portion 6-200, and the second electromagnetic driving members 6-420B can be disposed on the lateral walls 6-220. In this embodiment, the second electromagnetic driving members 6-420A and 6-420B can be respectively accommodated in the depressions 6-212 and 6-222, so as to miniaturize the optical member driving mechanism 6-10.

For example, the first electromagnetic driving members 6-410A and 6-410B can be coils, and the second electromagnetic driving members 6-420A and 6-420B can be magnets. Since the first electromagnetic driving member 6-410A corresponds to the second electromagnetic driving member 6-420A, when a current flows through the first electromagnetic driving member 6-410A, an electromagnetic effect is generated between the first electromagnetic driving member 6-410A and the second electromagnetic driving member 6-420A, and the movable portion 6-200 is driven to rotate around a first rotation axis 6-AX1 relative to the fixed portion 6-100. In this embodiment, the first rotation axis 6-AX1 passes through the supporting member 6-300.

Similarly, since the first electromagnetic driving member 6-410B corresponds to the second electromagnetic driving member 6-420B, when a current flows through the first electromagnetic driving member 6-410B, an electromagnetic effect is generated between the first electromagnetic driving member 6-410B and the second electromagnetic driving member 6-420B, and the movable portion 6-200 is driven to rotate around a second rotation axis 6-AX2 relative to the fixed portion 6-100. In this embodiment, the second rotation axis 6-AX2 is perpendicular to the first rotation axis 6-AX1, and the second rotation axis 6-AX2 also passes through the supporting member 6-300.

Due to the rotation of the movable portion 6-200 relative to the fixed portion 6-100, the optical member 6-30 on the movable portion 6-200 can also rotate relative to the fixed portion 6-100. Thus, the emission direction of the reflected light can be lightly adjusted. In some embodiments, the first electromagnetic driving members 6-410A and 6-410B can be magnets, and the second electromagnetic driving members 6-420A and 6-420B can be coils.

Since a part of the movable portion 6-200, a part of the base 6-110, and the supporting member 6-300 are made of metal, and the supporting member 6-300 is a ball, the debris caused by the friction during the rotation of the movable portion 6-200 relative to the fixed portion 6-100 can be reduced.

The position sensors 6-440 are disposed on the circuit board 6-430, and the positions of the position sensors 6-440 correspond to that of the second electromagnetic driving members 6-420A and 6-420B. The position sensors 6-440 are configured to detect the position of the second electromagnetic driving members 6-420A and 6-420B, so as to obtain the rotation angle of the movable portion 6-200 relative to the fixed portion 6-100.

For example, the position sensors 6-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 6:
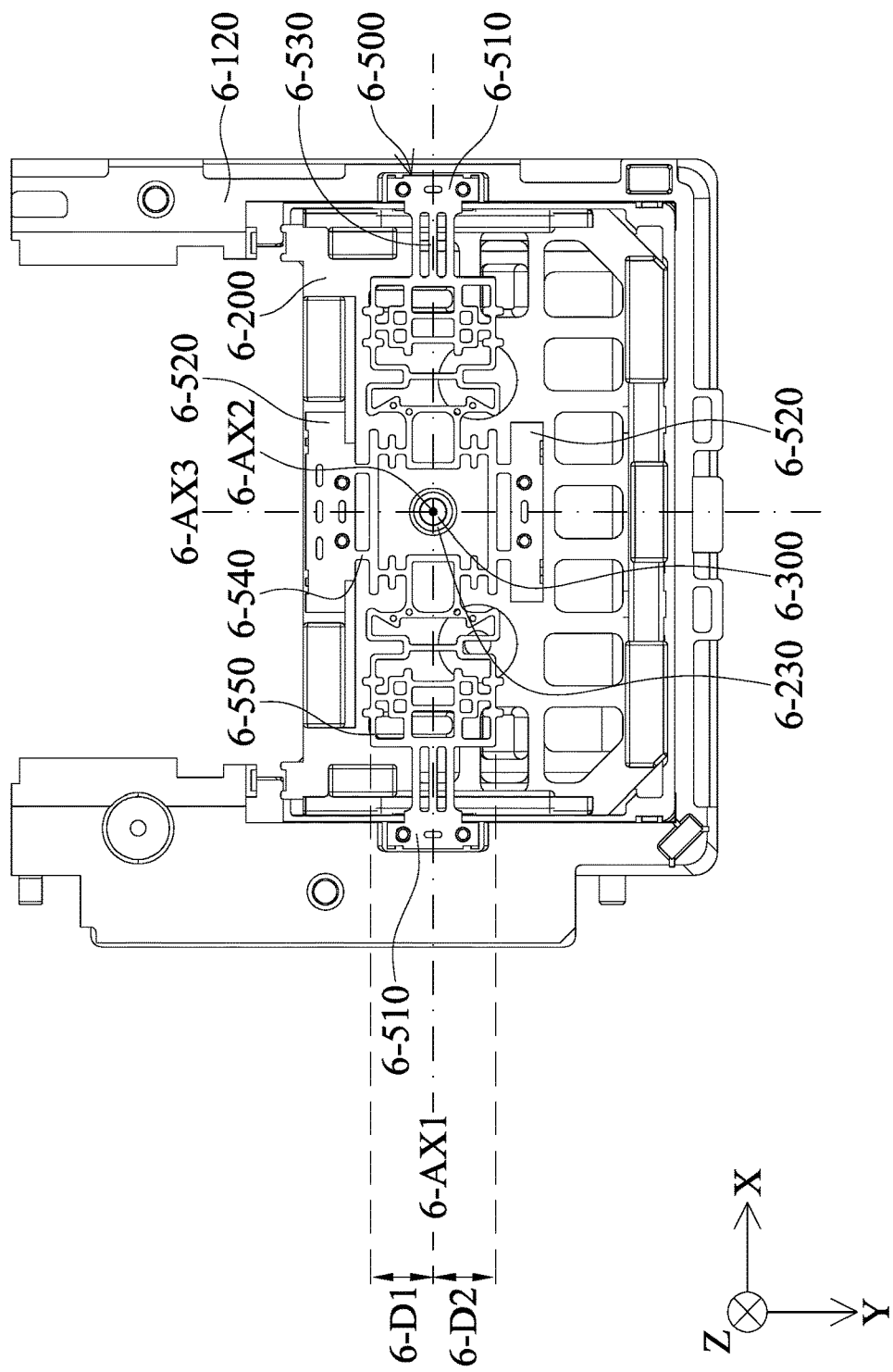
FIG. 6 is a bottom view of the optical member driving mechanism according to an embodiment of the invention, wherein the base is omitted.

Referring to FIG. 6, the elastic member 6-500 includes at least one first engaged section 6-510, at least one second engaged section 6-520, at least one first axis section 6-530, at least one second axis section 6-540, and a plurality of string sections 6-550.

The first engaged section 6-510 and the second engaged section 6-520 are respectively affixed to the fixed portion 6-100 and the movable portion 6-200. The first axis section 6-530 is connected to the first engaged section 6-510, the second axis section 6-540 is connected to the second engaged section 6-520, and the string sections 6-550 connect the first axis section 6-530 to the second axis section 6-540.

Before the current flows through the first electromagnetic driving members 6-410A and 410B, the elastic member 6-500 provides an elastic force to the movable portion 6-200 to push the movable portion 200 close to the base 6-110 of the fixed portion 6-100. Therefore, the movable portion 6-200 can tightly abut the supporting member 6-300, the supporting member 6-300 can be tightly clamped between the movable portion 6-200 and the base 6-110, and the separation of the supporting member 6-300 can be avoided.

In this embodiment, the elastic member 6-500 includes two first engaged sections 6-510 and two second engaged sections 6-520. Two first engaged sections 6-510 are arranged along the first rotation axis 6-AX1, and the second engaged sections 6-520 are arranged along another direction 6-AX3. The direction 6-AX3 is perpendicular to the first rotation axis 6-AX1 and the second rotation axis 6-AX2.

In direction 6-AX3, the string sections 6-550 can be divided into a first length 6-D1 and a second length 6-D2 by the first axis section 6-530. In this embodiment, the first length 6-D1 is substantially the same as the second length 6-D2, so that the elastic force applied to the movable portion 6-200 is uniform. Furthermore, as shown in FIG. 6, in this embodiment, the supporting member 6-300 is disposed on the intersection of the first rotation axis 6-AX1 and the second rotation axis 6-AX2.

Figure 7:
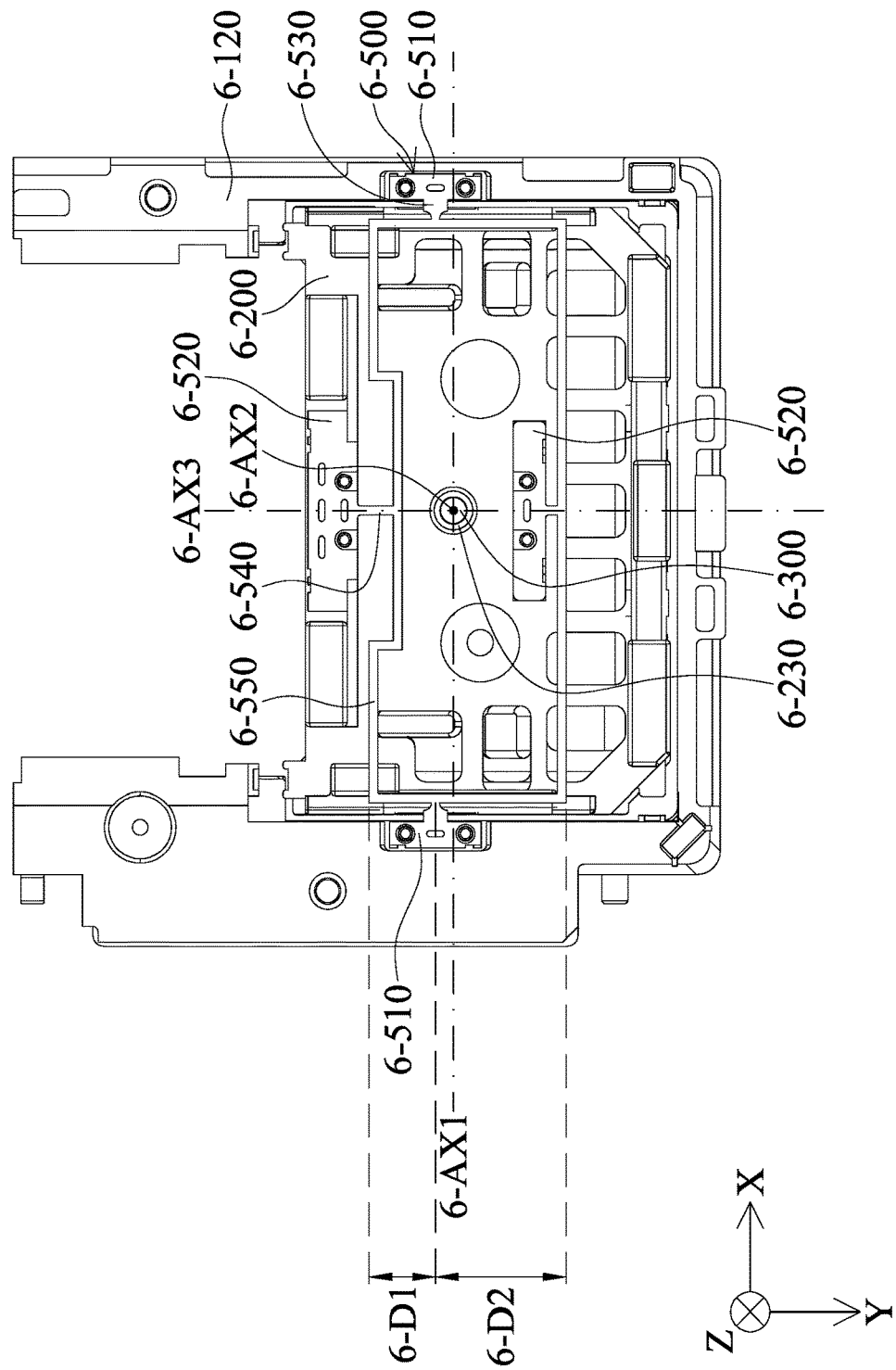
FIG. 7 is a bottom view of the optical member driving mechanism according to another embodiment of the invention, wherein the base is omitted.

The string sections 6-550 can be adjusted as required. For example, referring to FIG. 7, in another embodiment, the string sections 6-550 are divided into a first length 6-D1 and a second length 6-D2 by the first axis section 6-530, and the first length 6-D1 is less than the second length 6-D2. Moreover, in this embodiment, the first axis section 6-530 and the first rotation axis 6-AX1 are parallel, but they are not overlap each other.

Referring to FIG. 3, the magnetic permeability member 9-600 is embedded in the movable portion 6-200 and adjacent to the second electromagnetic driving members 6-420A and 6-420B, so as to enhance the magnetic pushing force of the driving assembly 6-400.

In summary, an optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to connect an optical member;
   a fixed portion, having an accommodating space and a base, wherein the optical member is received in the accommodating space, and the movable portion is movable relative to the fixed portion;
   a driving assembly, configured to drive the movable portion to move relative to the fixed portion; and
   a supporting member, disposed between the movable portion and the base to form a gap, wherein the movable portion has a bottom surface and an annular structure, the bottom surface faces the base, and the annular surface protrudes from the bottom surface and surrounds the supporting member.

2. The optical member driving mechanism as claimed in claim 1, wherein the supporting member is a ball.

3. The optical member driving mechanism as claimed in claim 1, wherein the inner diameter of the annular structure is substantially the same as the diameter of the supporting member.

4. The optical member driving mechanism as claimed in claim 1, wherein the supporting member protrudes from the annular structure.

5. The optical member driving mechanism as claimed in claim 1, wherein the optical member is configured to adjust an emission direction of light from an incident direction to an outgoing direction, and a center of the optical member overlaps the supporting member as seen from the incident direction.

6. The optical member driving mechanism as claimed in claim 1, wherein the driving assembly is configured to drive the movable portion to rotate around a first rotation axis and a second rotation axis relative to the fixed portion, the first rotation axis is perpendicular to the second rotation axis, and the supporting member is disposed on the intersection of the first rotation axis and the second rotation axis.

7. The optical member driving mechanism as claimed in claim 1, wherein the optical member driving mechanism further comprises an elastic member, connected to the fixed portion and the movable portion, and an elastic force is exerted on the movable portion.

8. The optical member driving mechanism as claimed in claim 7, wherein the elastic force pushes the movable portion close to the base.

9. The optical member driving mechanism as claimed in claim 7, wherein the elastic member comprises:
   a first engaged section, connected to the fixed portion;
   a second engaged section, connected to the movable portion;
   a first axis section, connected to the first engaged section;
   a second axis section, connected to the second engaged section; and
   a string section, connected to the first axis section and the second axis section.

10. The optical member driving mechanism as claimed in claim 9, wherein the driving assembly is configured to drive the movable portion to rotate around a first rotation axis and a second rotation axis relative to the fixed portion, and the first rotation axis is perpendicular to the second rotation axis, wherein in a direction perpendicular to the first rotation axis and the second rotation axis, the string section is divided into a first length and a second length by the first axis section, and the first length is substantially the same as the second length.

11. The optical member driving mechanism as claimed in claim 9, wherein the driving assembly is configured to drive the movable portion to rotate around a first rotation axis and a second rotation axis relative to the fixed portion, and the first rotation axis is perpendicular to the second rotation axis, wherein in a direction perpendicular to the first rotation axis and the second rotation axis, the string section is divided into a first length and a second length by the first axis section, and the first length is different from the second length.

12. The optical member driving mechanism as claimed in claim 9, wherein the driving assembly is configured to drive the movable portion to rotate around a first rotation axis and a second rotation axis relative to the fixed portion, the first axis section is parallel to the first rotation axis, and the first axis section does not overlap the first rotation axis as seen from the second rotation axis.

13. The optical member driving mechanism as claimed in claim 1, wherein the movable portion comprises a restriction structure having an inclined surface.

14. The optical member driving mechanism as claimed in claim 13, wherein the inclined surface faces the optical member.

* * * * *